Figure 1:
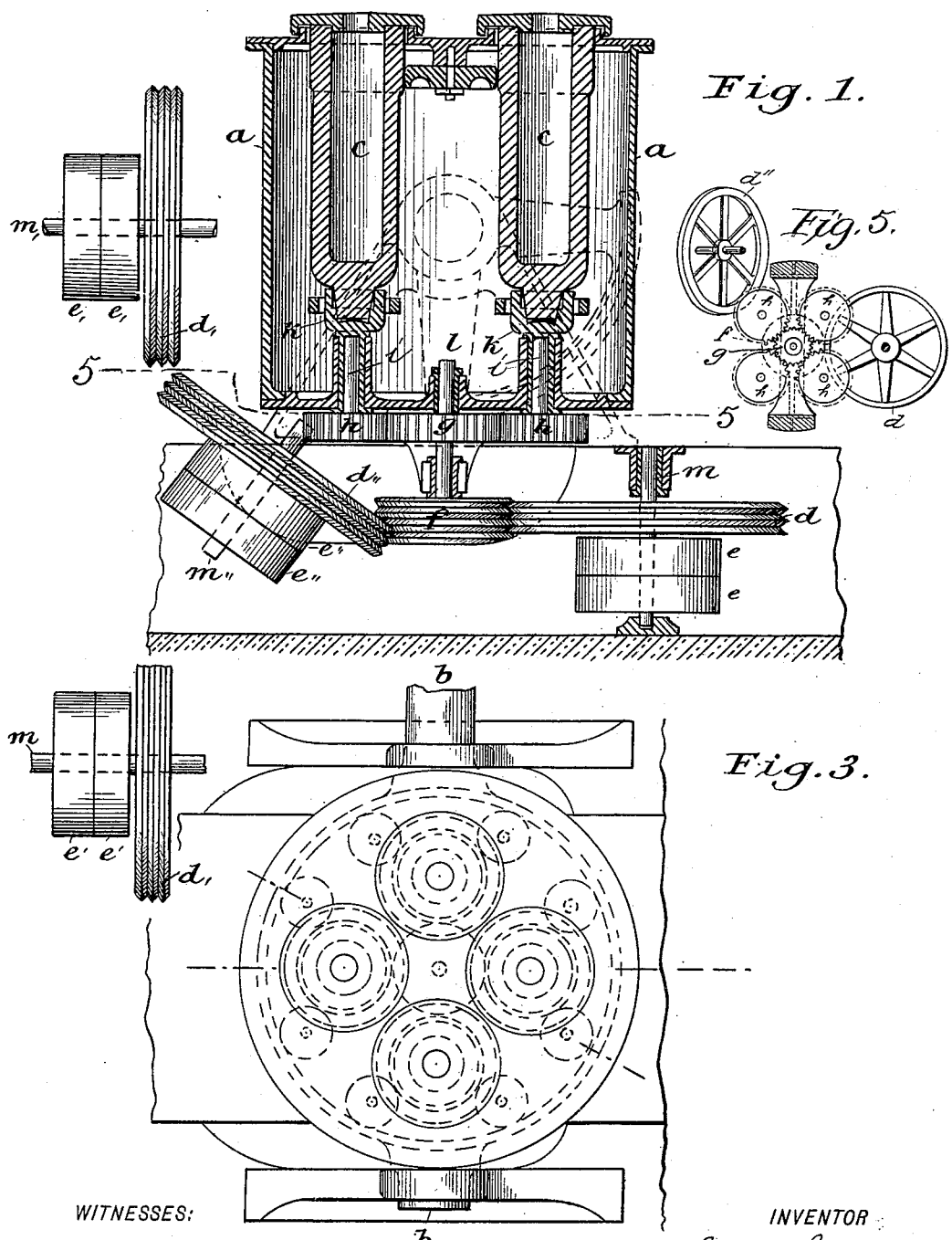

No. 648,601. Patented May 1, 1900.
F. G. STRIDSBERG.
CENTRIFUGAL APPARATUS FOR CASTING.
(Application filed June 17, 1898.)
(No Model.) 2 Sheets—Sheet 2.
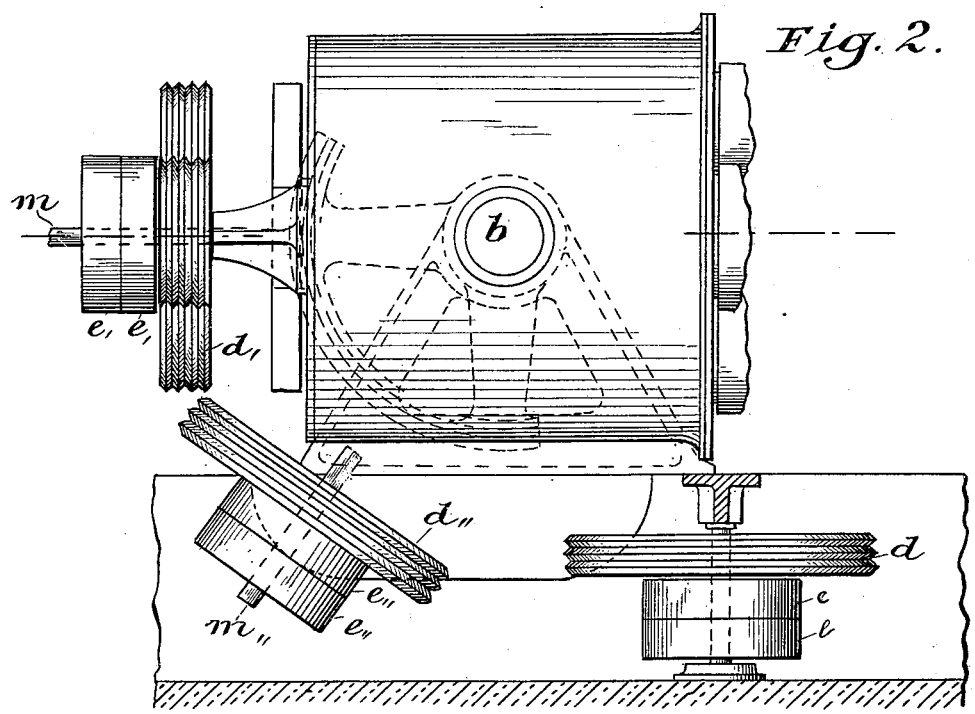
Fig. 2.
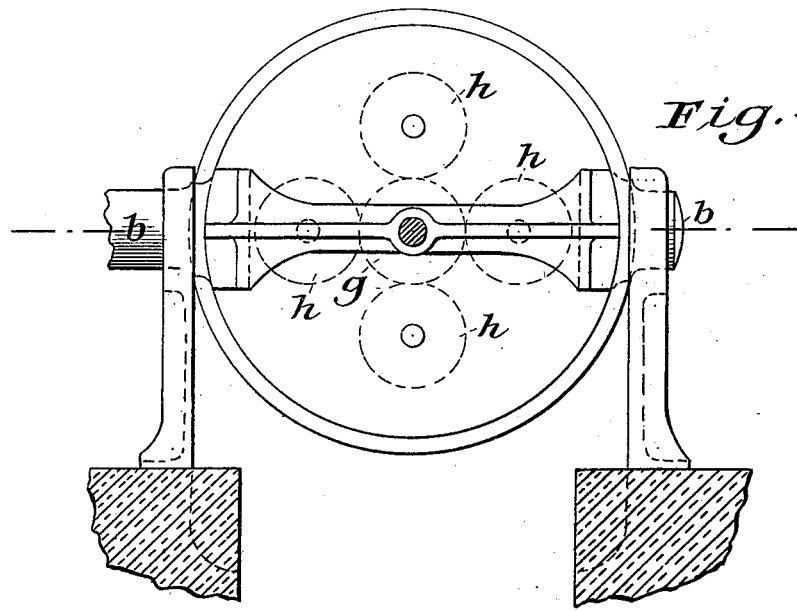
Fig. 4.
WITNESSES:
INVENTOR
Frans Gustaf Stridsberg
BY
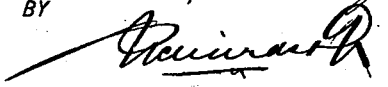
ATTORNEYS
THE NORRIS PETERS CO., PHOTO-LITHO., WASHINGTON, D. C.

UNITED STATES PATENT OFFICE.

FRANS GUSTAF STRIDSBERG, OF STOCKHOLM, SWEDEN.

CENTRIFUGAL APPARATUS FOR CASTING.

SPECIFICATION forming part of Letters Patent No. 648,601, dated May 1, 1900.

Application filed June 17, 1898. Serial No. 683,689. (No model.)

*To all whom it may concern:*

Be it known that I, FRANS GUSTAF STRIDSBERG, engineer, a subject of the King of Sweden and Norway, and a resident of St. Eriks plan 2, Stockholm, in the Kingdom of Sweden, have invented certain new and useful Improvements in Centrifugal Apparatus for Making Hollow or Solid Ingots of Metal, of which the following is a specification, reference being had therein to the accompanying drawings.

This invention relates to an apparatus by means of which the known method of producing hollow cylindrical castings by the aid of centrifugal force can be carried out in practice, the apparatus being more especially intended for use in making sound hollow ingots for the manufacture of tubes.

Figure 1 shows the apparatus in a vertical section, the centrifugal apparatus being seen in its vertical position, and Fig. 3 the apparatus in a plan view. Fig. 2 represents an elevation of the apparatus; and Fig. 4 a view of it from one end, the driving arrangement being here left out. Fig. 5 is a plan view on line 5 5 of Fig. 1.

The apparatus consists of a casing $a$, in which are placed one or more molds $c$. The casing is suspended on gudgeons $b$ in order to allow of tipping it, so as to bring the molds to occupy a vertical, horizontal, or inclined position. The lower ends of the molds are joined by means of coupling-sleeves $k$ to driving-shafts $i$, to which the power is transmitted by means of gearing or gear-wheels $h$ from a common wheel $g$ on a central shaft $l$, which is also provided with a gear-wheel $f$. When one mold only is employed, evidently no wheels $g$ and $h$ will be needed, the shaft $l$ being simply provided at its upper end with a coupling-sleeve $k$ for receiving the mold. The motive power is transmitted to the centrifugal apparatus by bringing the driving-wheel $f$ in contact with a similar driving-wheel $d$, $d'$, or $d''$, located in such positions with relation to the gudgeons $b$ of the centrifugal apparatus that the ingot-molds will occupy the desired positions in each respective case. The driving-wheels $d$ are mounted on shafts $m$, which are also provided with suitable means for receiving the motive power from a motor—as, for instance, belt-pulleys $e$, $e'$, and $e''$, cranks, bevel-gears, or the like. Motors—for instance, steam-turbines or electric motors—may alternatively be applied directly to the shafts $m$, $m'$, and $m''$. The driving-wheels $d$ and $f$ are preferably made in the shape of friction-pulleys in order that power may be transmitted from one to the other by mere contact. In Figs. 1 and 2 is shown how power may be transmitted to the centrifugal apparatus in three positions of the latter—viz., one vertical, one inclined, and one horizontal. The metal is poured into the heated ingot-molds while they are in the vertical position, and the molds are set rotating in this position immediately on commencing the pouring. When the molds have been allowed to rotate at the required velocity for a length of time that is adequate to the treatment of the metal for producing a hollow ingot, the driving-wheel $f$ is by turning the apparatus disengaged from the wheel $d$ and brought into engagement with the wheel $d''$ or $d'''$ in order to facilitate a uniform distribution of the metal at the walls of the mold by bringing the latter in a different position and cause the ingot to retain its shape while solidifying. Owing to their inertia the molds continue their rotation while being turned from one driving position to the other; but their stored power is insufficient for keeping up their rotation for the desired length of time, and it is therefore necessary to supply the motive power until the metal has solidified. The metal must be poured into the molds while the latter are in the vertical position in order to prevent the formation of flakes or spirals of cooled metal on the surface of the ingot. In pouring the upper surface of the metal will rise along the walls of the mold, while in the said upper surface there forms a funnel-shaped cavity which does not reach down to the bottom of the mold. When the mold is brought into the horizontal position, the metal can flow out and become distributed along the inner walls of the mold, so as to produce an ingot of uniform thickness of metal.

Having now described my invention, what I claim as new, and desire to secure by Letters Patent, is—

1. A centrifugal apparatus for casting ingots, comprising a tilting support, a rotary mold journaled in said support and having an extended operating-shaft, a wheel operatively connected with said shaft and arranged to tilt therewith and a plurality of independent driving-wheels arranged in different positions, said wheel on the tilting support being adapted to separately engage said driving-wheels to rotate the mold, substantially as described.

2. In combination, the tilting casing or support, the plurality of rotary molds journaled therein, the driving-shaft operatively connected therewith, an operating-wheel $f$ carried by said shaft, and a plurality of independent driving-wheels adapted to be separately engaged by said wheel $f$, substantially as described.

In witness whereof I have hereunto signed my name in the presence of two subscribing witnesses.

FRANS GUSTAF STRIDSBERG.

Witnesses:
ERNST SVANQVIST,
E. HERMANSSON.